United States Patent
Lindelauf et al.

(10) Patent No.: US 12,276,375 B2
(45) Date of Patent: Apr. 15, 2025

(54) APPARATUS COMPRISING A WALL FRAME AND AN APPLICATION FRAME, WHEREIN THE APPLICATION FRAME IS MOVABLE WITH RESPECT TO THE WALL FRAME

(71) Applicant: Anchis Technology B.V., Maastricht (NL)

(72) Inventors: Paul August Marie Lindelauf, Maastricht (NL); Hendricus Tadeusz Wojcik, Maastricht (NL); Robert Hubert Marcel Schmetz, Maastricht (NL); Thijs Jeurissen, Maastricht (NL)

(73) Assignee: Anchis Technology B.V., Maastricht (NL)

( * ) Notice: Subject to any disclaimer, the term of this patent is extended or adjusted under 35 U.S.C. 154(b) by 0 days.

(21) Appl. No.: 18/334,943

(22) Filed: Jun. 14, 2023

(65) Prior Publication Data
US 2023/0408027 A1 Dec. 21, 2023

(30) Foreign Application Priority Data
Jun. 17, 2022 (NL) .................................. 2032203

(51) Int. Cl.
F16M 13/02 (2006.01)
F16M 11/04 (2006.01)
F16M 11/18 (2006.01)

(52) U.S. Cl.
CPC ........ F16M 13/022 (2013.01); F16M 11/046 (2013.01); F16M 11/18 (2013.01); F16M 2200/047 (2013.01)

(58) Field of Classification Search
CPC .... F16M 13/022; F16M 11/046; F16M 11/18; F16M 2200/047
See application file for complete search history.

(56) References Cited

U.S. PATENT DOCUMENTS 8,056,877 B2 * 11/2011 Wang ..................... F16M 11/24
248/176.1
9,631,772 B1 * 4/2017 Huang ................. F16M 11/046
(Continued)

FOREIGN PATENT DOCUMENTS

CN 206093381 U * 4/2017
CN 106969244 A * 7/2017
(Continued)

*Primary Examiner* — Eret C McNichols
*Assistant Examiner* — Ding Y Tan
(74) *Attorney, Agent, or Firm* — Peacock Law P.C.; Justin R. Muehlmeyer; Daniel J. Berener-Russell

(57) ABSTRACT

An apparatus comprising a wall frame and an application frame. The application frame is movable with respect to the wall frame. The apparatus includes a first spring system and a second spring system, which two spring systems are each coupled with the wall frame and the application frame to apply forces on the application frame. The first spring system has its opposite ends connected to the wall frame and the application frame respectively. The second spring system is at a first end connected to the wall frame and the second spring system is at a second end distant from the first end connected to an adjusting device which is coupled with the application frame. The adjusting device is arranged to vary an extension of the second spring system when the application frame moves with respect to the wall frame. The adjusting device includes a single trajectory profile element, and only a first arm and a second arm that are connected to each other at a first hinge. An end of the first arm distant from the first hinge is with a second hinge connected to the application frame. An end of the second arm distant from the first hinge is with a third hinge connected to the second spring system. The first hinge that joins the first arm and the second arm is movably connected to and guided by the single trajectory profile element.

5 Claims, 5 Drawing Sheets

(56) References Cited

U.S. PATENT DOCUMENTS

| | | | |
|---|---|---|---|
| 10,190,725 B2 * | 1/2019 | Aoyagi | F16M 11/046 |
| 2018/0363843 A1 * | 12/2018 | Huang | F16M 13/022 |
| 2019/0242519 A1 * | 8/2019 | Huang | F16M 11/06 |
| 2020/0103069 A1 * | 4/2020 | You | F16M 11/046 |

FOREIGN PATENT DOCUMENTS

| | | | | |
|---|---|---|---|---|
| CN | 111102440 A | * | 5/2020 | |
| DE | 212017000322 U1 | | 11/2019 | |
| EP | 2223004 B1 | * | 4/2012 | F16M 11/046 |

* cited by examiner

APPARATUS COMPRISING A WALL FRAME AND AN APPLICATION FRAME, WHEREIN THE APPLICATION FRAME IS MOVABLE WITH RESPECT TO THE WALL FRAME

This application claims priority to and the benefit of Netherlands Patent Application No. 2032203, titled "APPARATUS COMPRISING A WALL FRAME AND AN APPLICATION FRAME, WHEREIN THE APPLICATION FRAME IS MOVABLE WITH RESPECT TO THE WALL FRAME", filed on Jun. 17, 2022, and the specification and claims thereof are incorporated herein by reference.

BACKGROUND OF THE INVENTION

Field of the Invention

The invention relates to an apparatus comprising a wall frame and an application frame, wherein the application frame is movable with respect to the wall frame, said apparatus further comprising a first spring system and a second spring system, which two spring systems are each coupled with the wall frame and the application frame and produce forces that are applied to the application frame, wherein the first spring system has its opposite ends connected to the wall frame and the application frame respectively, and the second spring system is at a first end connected to the wall frame and said second spring system is at a second end distant from the first end connected to an adjusting device which is coupled with the application frame, said adjusting device being arranged to vary an extension of the second spring system when the application frame moves with respect to the wall frame.

Background Art

Applicant's EP-B-2 223 004 describes an apparatus for exercising a force on a load provided with a balancing mechanism, which Applicant supplies to the market. Although the apparatus and mechanism described in EP-B-2 223 004 operates satisfactorily, it is among the objects of the instant invention to simplify the known apparatus and reduce costs, and further to reduce the required dimensions of the known apparatus.

Discussion of references herein is given for a more complete background and is not to be construed as an admission that such references are prior art for purposes of determining patentability. The entire disclosures of all references, applications, patents, and publications cited in this application are hereby incorporated by reference.

BRIEF SUMMARY OF THE INVENTION

Some embodiments of the present invention have the features of one or more of the appended claims.

In a first aspect of the invention, a second spring system and an adjusting device are facing each other only at a single side of each other and without the second spring system facing the adjusting device at any other side than said single side so as to provide an asymmetric construction of the springs and the adjusting device within the apparatus. At the same time the adjusting device comprises a single trajectory profile element, and only and no more than a first arm and a second arm that are connected to each other at a first hinge, wherein an end of the first arm distant from the first hinge is with a second hinge connected to the application frame, and an end of the second arm distant from the first hinge is with a third hinge connected to the second spring system, and that the first hinge that joins the first arm and the second arm is movably connected to and guided by the single trajectory profile element.

The apparatus of the invention thus requires less parts, is therefore simpler in construction and more cost efficient. Moreover, the size of the apparatus of the invention is notably reduced in comparison with the known apparatus.

A further reduction in occupied space is possible by arranging that the adjusting device is oriented obliquely, i.e. clearly non-parallel with reference to front and back walls of the apparatus. Preferably the adjusting device is placed at such a clearly non-parallel orientation by applying an angle of approximately 5° with reference to front and back walls of the apparatus.

For a smooth operation of the apparatus of the invention it is desirable that the third hinge is provided with a first guide wheel that runs in a first wheel guide that is provided on the application frame.

It is further preferred that the application frame is provided with one or more second guide wheels running in wheel guides provided on the wall frame. This further supports the smooth operation of the apparatus of the invention, particularly since the forces acting on the single trajectory profile element are asymmetric, which could otherwise result in improper outlining of the application frame with reference to the wall frame.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
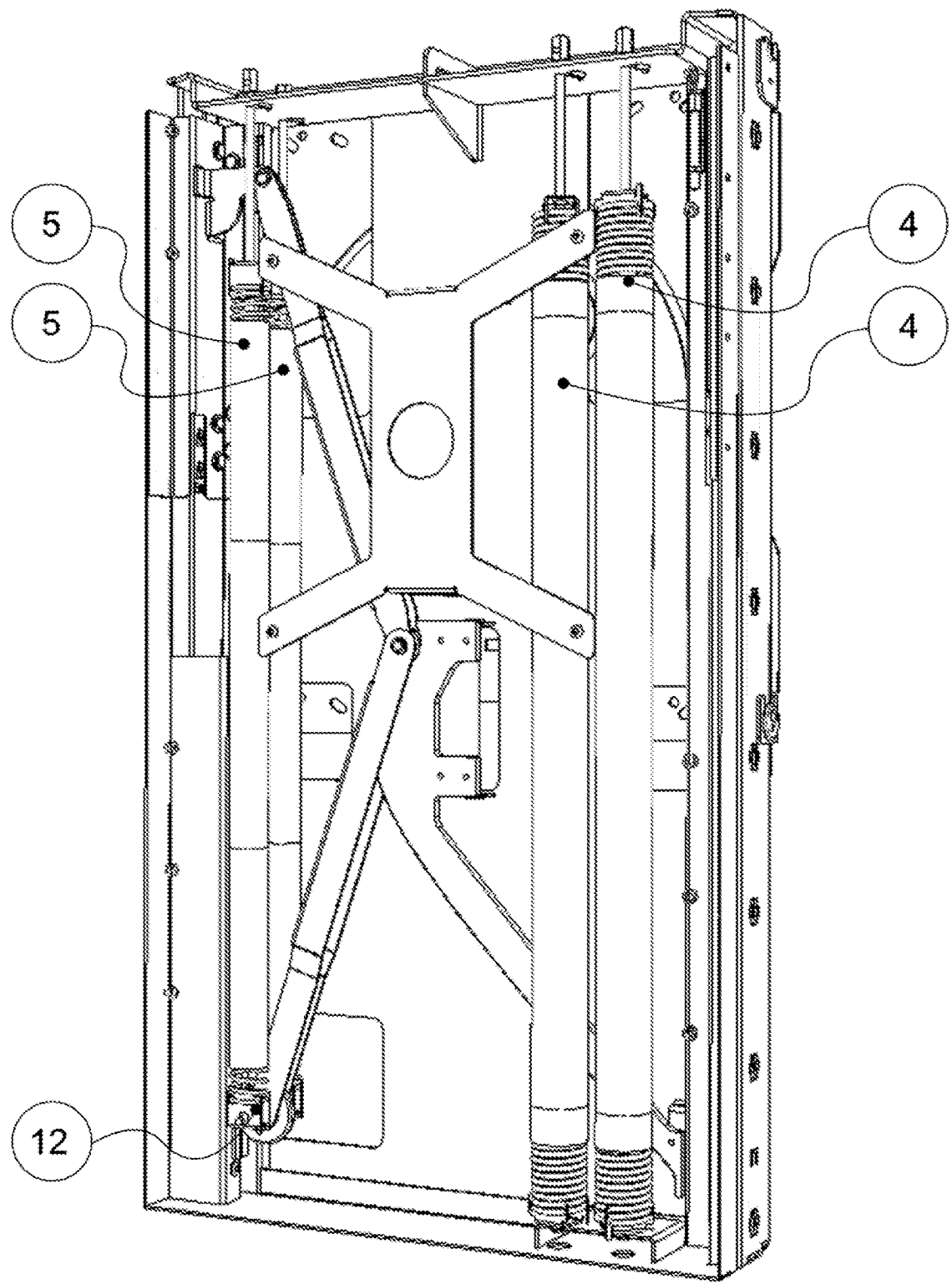
FIG. 1 is an illustration showing an open side view of an apparatus according to an embodiment of the present invention.

Whenever in the figures the same reference numerals are applied, these numerals refer to the same parts.

Figure 2:
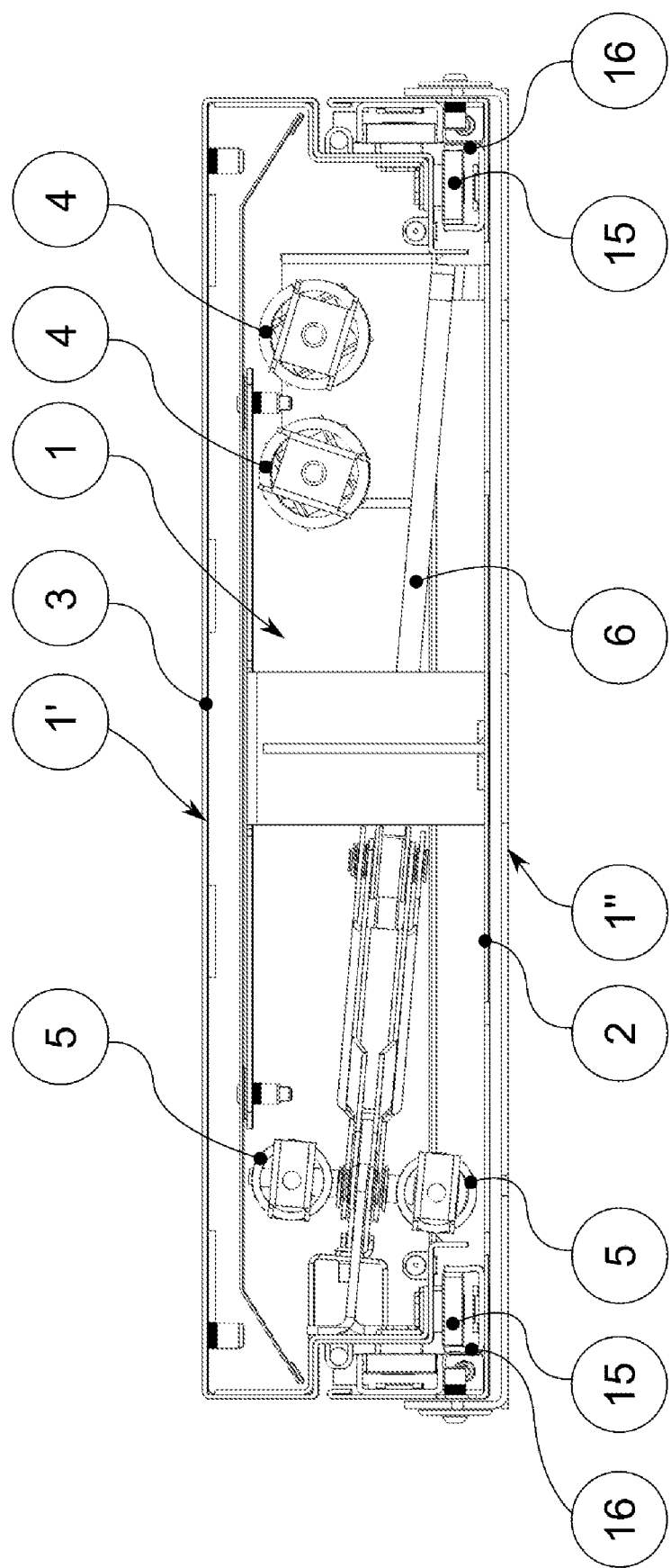
FIG. 2 is an illustration showing a cross-sectional top view of an apparatus according to an embodiment of the present invention.
Figure 3:
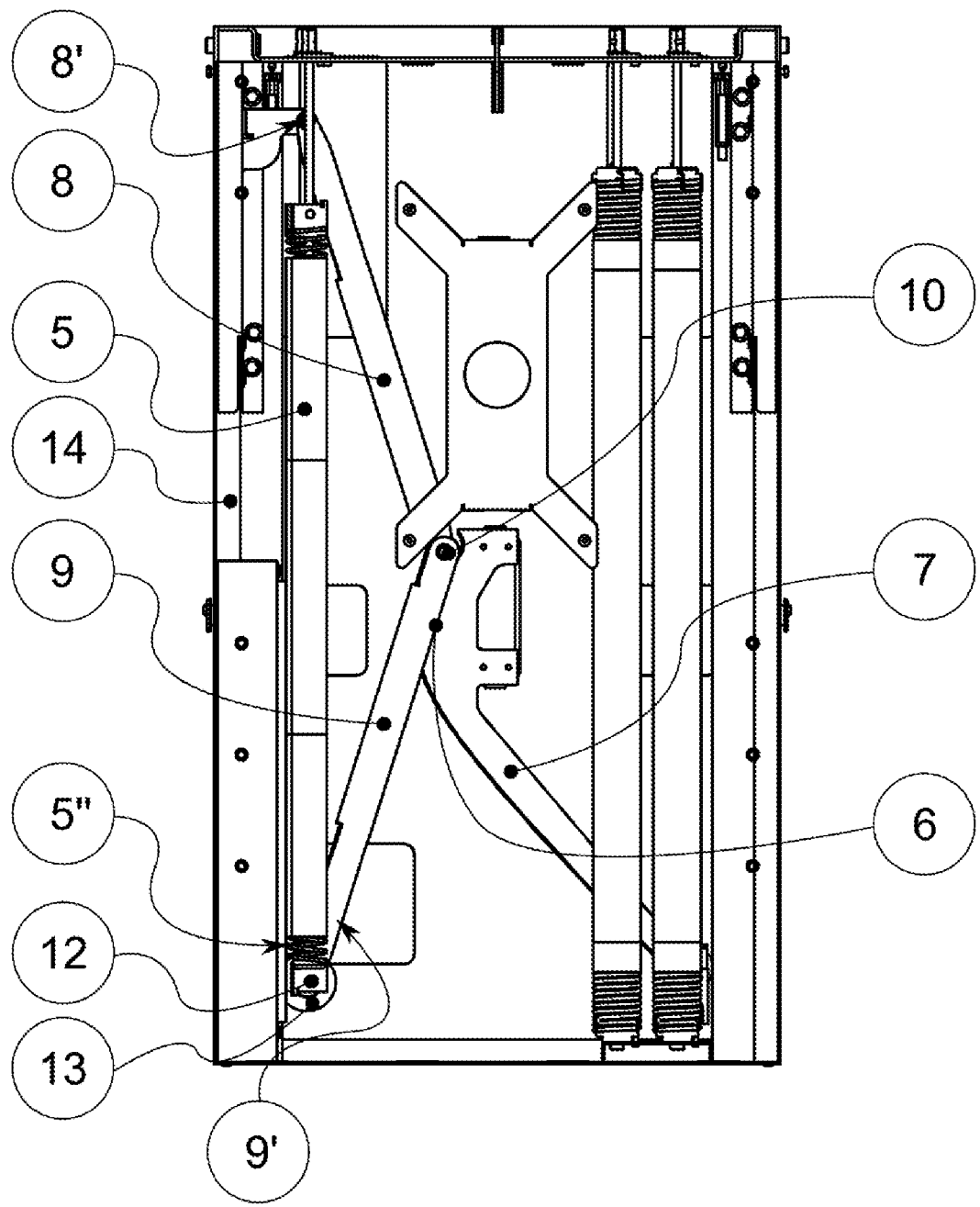
FIGS. 3, 4 and 5 are illustrations showing different positions of the application frame of an apparatus according to the present invention, with respect to the wall frame.
Figure 4:
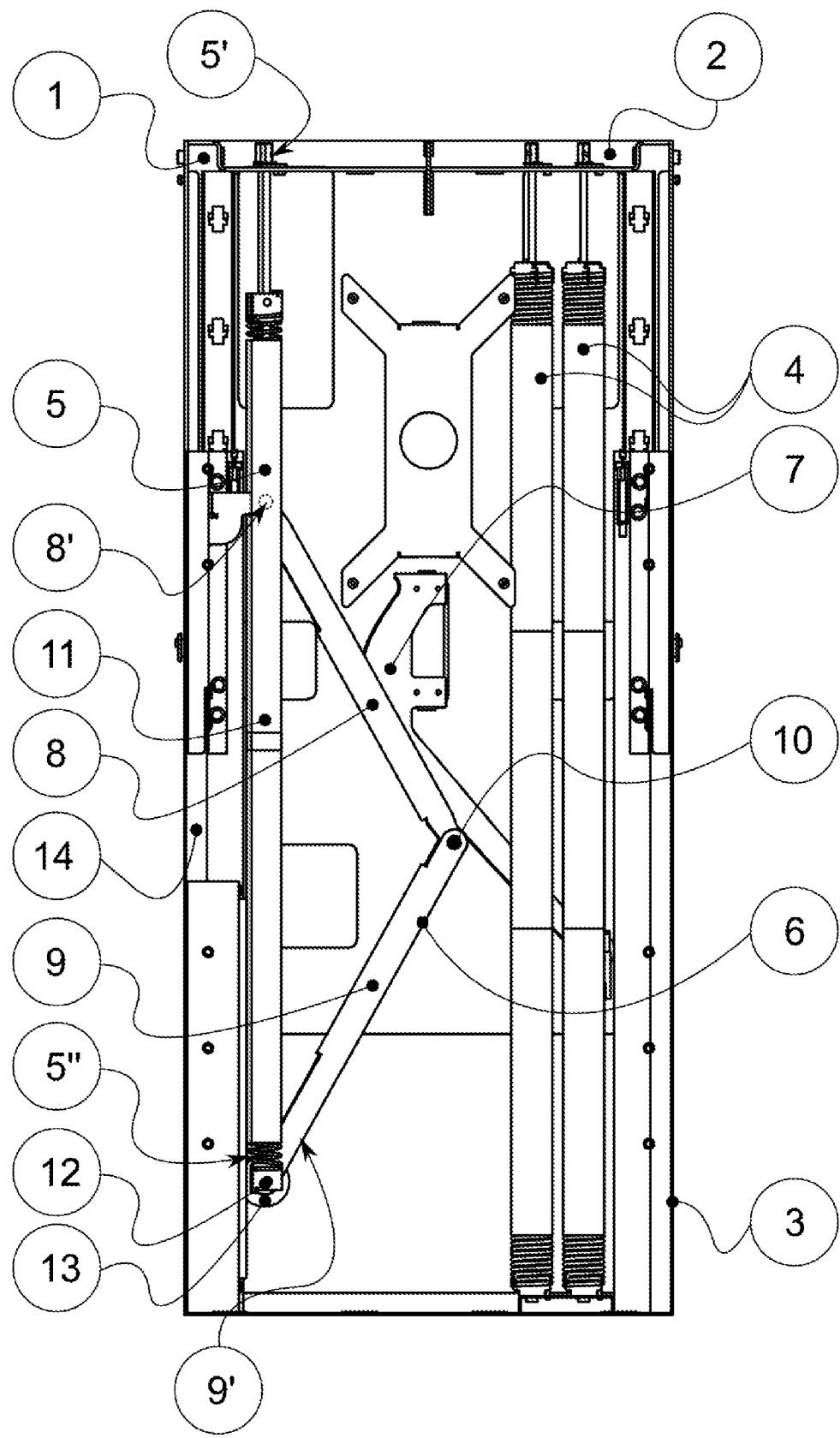
Figure 5:
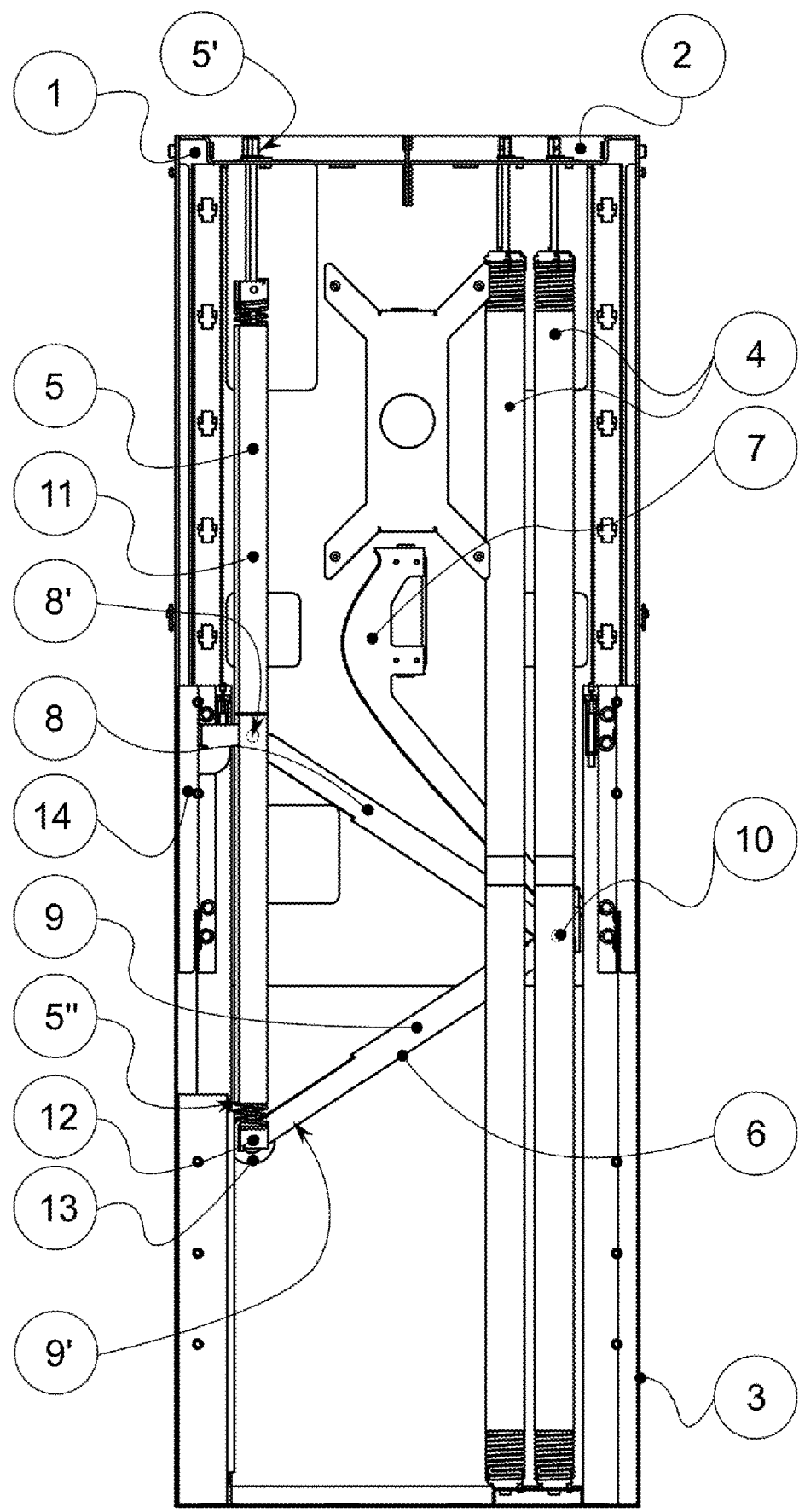

Referring to FIG. 2, an apparatus 1 of the invention is shown in a cross-sectional top view. The figure shows that apparatus 1 comprises wall frame 2 to be mounted on a fixed world, and application frame 3 which can support a particular application such as a billboard or black-board. As shown in FIGS. 3-5, application frame 3 is movable with respect to wall frame 2. In FIG. 3, application frame 3 and wall frame 2 are at a same height, whereas in FIG. 4 and FIG. 5, application frame 3 is moved down partly (FIG. 4) and completely (FIG. 5).

Turning back to FIG. 2, it is shown that apparatus 1 of the invention further comprises first spring system 4 and second spring system 5 as is also shown in FIG. 1.

The two spring systems 4, 5 are each coupled with wall frame 2 and application frame 3 and produce forces that are applied to application frame 3 so as to balance application frame 3 throughout its motion with reference to wall frame 2.

First spring system 4 has its opposite ends connected to wall frame 2 and application frame 3 respectively, which may be best seen in FIGS. 3, 4, and 5.

Second spring system 5 is at first end 5' connected to wall frame 2 and second spring system 5 is at second end 5" distant from first end 5' connected to adjusting device 6 which is coupled with application frame 2. Adjusting device 6 is arranged to vary an extension of the second spring system 5 when application frame 3 moves with respect to wall frame 2, which may again be best understood by comparing FIGS. 3, 4, and 5. FIG. 3 shows the apparatus in a starting position wherein second spring system 5 is not or hardly at all extended. In FIG. 4 the extension of second spring system 5 has increased to the fullest, when application frame 3 is moved downwards halfway. Finally in FIG. 5, application frame 3 has been lowered to the fullest extent, and second spring system 5 has been extended slightly less than in the position shown in FIG. 4.

To accomplish one thing and another these FIGS. 3, 4 and 5 show that adjusting device 6 comprises a single trajectory profile element 7, and only and not more than first arm 8 and second arm 9 that are connected to each other at first hinge 10. First hinge 10 that joins first arm 8 and second arm 9 is movably connected to and guided by the single trajectory profile element 7. Further, end 8' of the first arm 8 distant from first hinge 10 is with second hinge 11 connected to application frame 3. Likewise, end 9' of second arm 9 distant from first hinge 10 is with third hinge 12 connected to second spring system 5. Third hinge 12 is provided with first guide wheel 13 that runs in first wheel guide 14 that is provided on application frame 3.

It shows that second spring system 5 and adjusting device 6 are facing each other at a single side of each other only and without second spring system 5 facing adjusting device 6 at any other side than said single side so as to provide an asymmetric and space-saving placement of the springs and adjusting device 6 within the apparatus.

Turning back to FIG. 2, it is shown that adjusting device 6 is preferably also deliberately oriented obliquely, i.e. non-parallel with reference to front wall 1' and back wall 1" of apparatus 1. Preferably adjusting device 6 is placed at such a clearly non-parallel orientation by applying an angle of approximately 5° with reference to front and back walls 1', 1" of the apparatus.

FIG. 2 shows further that application frame 3 is provided with one or more second guide wheels 15 running in wheel guides 16 provided on wall frame 2.

Embodiments of the present invention can include every combination of features that are disclosed herein independently from each other. Although the invention has been discussed in the foregoing with reference to an exemplary embodiment of the apparatus of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another. The terms, "a", "an", "the", and "said" mean "one or more" unless context explicitly dictates otherwise. Note that in the specification and claims, "about" or "approximately" means within twenty percent (20%) of the numerical amount cited.

What is claimed is:

1. An apparatus comprising:
    a wall frame; and
    an application frame, wherein the application frame is movable with respect to the wall frame;
    a first spring system and a second spring system, which two spring systems are each coupled with the wall frame and the application frame to apply forces on the application frame,
    wherein the first spring system has its opposite ends connected to the wall frame and the application frame respectively, and the second spring system is at a first end connected to the wall frame and the second spring system is at a second end distant from the first end connected to an adjusting device which is coupled with the application frame, the adjusting device being arranged to vary an extension of the second spring system when the application frame moves with respect to the wall frame,
    wherein the second spring system and the adjusting device are facing each other at a single side of each other only and without the second spring system facing the adjusting device at any other side than the single side so as to provide an asymmetric placement of the springs and the adjusting device within the apparatus, wherein the asymmetrical placement is along an axis that is parallel to the second spring system, said axis having along its length a constant distance with reference to the second spring system, and that the adjusting device comprises a single trajectory profile element, and only and no more than a first arm and a second arm that are connected to each other at a first hinge,
    wherein an end of the first arm distant from the first hinge is with a second hinge connected to the application frame, and an end of the second arm distant from the first hinge is with a third hinge connected to the second spring system, and that the first hinge that joins the first arm and the second arm is movably connected to and guided by the single trajectory profile element.

2. The apparatus of claim 1, wherein the adjusting device is oriented obliquely and non-parallel with reference to front and back walls of the apparatus so as to limit space occupied by the apparatus.

3. The apparatus of claim 1, wherein the adjusting device is placed at an angle of approximately 5° with reference to front and back walls of the apparatus.

4. The apparatus of claim 1, wherein the third hinge comprises a first guide wheel that runs in a first wheel guide that is disposed on the application frame.

5. The apparatus of claim 1, wherein the application frame further comprises one or more second guide wheels running in wheel guides disposed on the wall frame.

\* \* \* \* \*